United States Patent [19]

Zhao et al.

[11] Patent Number: 5,931,052
[45] Date of Patent: Aug. 3, 1999

[54] CRANKSHAFT GEAR TORSIONAL VIBRATION ISOLATOR ASSEMBLY FOR AN ENGINE

[75] Inventors: Alan Zhao; Charles E. Long; Dennis R. Tibbetts; Jeffrey D. Saueressig; Thomas E. Reinhart, all of Columbus, Ind.

[73] Assignee: Simpson International (UK) Ltd., Halifax, United Kingdom

[21] Appl. No.: 08/879,967

[22] Filed: Jun. 20, 1997

Related U.S. Application Data

[63] Continuation-in-part of application No. 08/662,319, Jun. 13, 1996, abandoned.

[51] Int. Cl.⁶ .............................. F16F 15/10; F02B 75/06
[52] U.S. Cl. ............................ 74/574; 464/74; 123/192.1
[58] Field of Search ....................... 74/574, 572, 573 R, 74/440, 409; 464/73, 74, 160, 180; 123/192.1; 192/209

[56] References Cited

U.S. PATENT DOCUMENTS

| | | |
|---|---|---|
| 1,649,426 | 11/1927 | Van Ranst . |
| 1,913,803 | 6/1933 | Griswold . |
| 2,012,012 | 8/1935 | Kitzman . |
| 2,159,235 | 5/1939 | Tyler et al. . |
| 2,446,942 | 8/1948 | McFarland . |
| 2,477,175 | 7/1949 | Gee . |
| 2,514,136 | 7/1950 | O'Connor . |

(List continued on next page.)

FOREIGN PATENT DOCUMENTS

| | | |
|---|---|---|
| 1049924 | 1/1954 | France . |
| 536684 | 10/1931 | Germany . |
| 747011 | 9/1944 | Germany . |
| 837343 | 4/1952 | Germany . |
| 2115099 | 10/1972 | Germany . |
| 3215765 | 5/1983 | Germany . |
| 591637 | 2/1978 | Russian Federation . |
| 696213 | 11/1979 | Russian Federation . |
| 760475 | 10/1956 | United Kingdom . |
| 2089472 | 6/1982 | United Kingdom . |
| 2153489 | 8/1985 | United Kingdom . |
| 2173879 | 10/1986 | United Kingdom . |
| WO 93/00530 | 1/1993 | WIPO ..................................... 74/440 |

OTHER PUBLICATIONS

Deutz, Technical Article PA6–280, Pielstick Cam Drive, Sep. 1976.
English Language Abstract of German Patent Publication DE3215765A1 published May 19, 1983.
Partial English Language Translation of Pielstick Technical Article.

*Primary Examiner*—John A. Jeffery
*Assistant Examiner*—Mary Ann Battista
*Attorney, Agent, or Firm*—Dykema Gossett PLLC

[57] ABSTRACT

An improved torsional vibration isolator assembly for an engine is provided which includes a non-linear spring device which effectively minimizes the transmission of torsional vibrations to the engine's gear train throughout all engine operating frequencies and conditions while limiting relative movement between the engine's crankshaft and crank gear so as to maintain timing error within acceptable limits. The improved torsional vibration isolator is designed to absorb torsional vibrations transmitted from the crankshaft so as to substantially isolate the entire engine gear train, including the crank gear, from the torsional vibrations throughout all engine operating conditions and frequencies, including at and below the natural frequency, i.e. crank resonance, of the crankshaft. The crank gear isolator includes resilient elements positioned in cavities formed between engaging projections formed on inner and outer rings of the assembly. The resilient elements and cavities are sized to create an expansion volume which is filled by the deforming resilient element during operation to limit further relative movement. The assembly may include a torsional vibration damper for dampening torsional vibrations transmitted from the crankshaft, especially during crankshaft resonance.

12 Claims, 6 Drawing Sheets

U.S. PATENT DOCUMENTS

| | | |
|---|---|---|
| 2,663,198 | 12/1953 | Cairnes . |
| 2,764,003 | 9/1956 | Croset . |
| 2,926,546 | 3/1960 | Paulsen . |
| 2,966,806 | 1/1961 | Luning . |
| 3,049,941 | 8/1962 | Rumsey . |
| 3,121,347 | 2/1964 | Rumsey . |
| 3,628,353 | 12/1971 | Armstrong . |
| 3,667,317 | 6/1972 | Hillingrathner . |
| 3,988,948 | 11/1976 | Thien et al. . |
| 4,114,246 | 9/1978 | Kamman . |
| 4,172,510 | 10/1979 | Forkel . |
| 4,629,443 | 12/1986 | Bördner et al. . |
| 4,739,670 | 4/1988 | Tomita et al. . |
| 4,747,321 | 5/1988 | Hannel . |
| 4,802,450 | 2/1989 | Roberts . |
| 4,825,983 | 5/1989 | Nakanishi . |
| 4,834,041 | 5/1989 | Valev . |
| 4,904,226 | 2/1990 | Chasseguet et al. . |
| 4,920,828 | 5/1990 | Kameda et al. . |
| 5,017,178 | 5/1991 | Krikke et al. . |
| 5,032,107 | 7/1991 | Umeyama et al. . |
| 5,052,244 | 10/1991 | Kamiya et al. . |
| 5,105,681 | 4/1992 | Naudin et al. . |
| 5,181,485 | 1/1993 | Hirose et al. . |
| 5,188,002 | 2/1993 | Wolf et al. . |
| 5,269,725 | 12/1993 | Maucher et al. . |
| 5,272,937 | 12/1993 | Brosowske et al. . |
| 5,299,468 | 4/1994 | Withers . |
| 5,535,643 | 7/1996 | Garza . |
| 5,535,705 | 7/1996 | Eguchi et al. . |

CRANKSHAFT GEAR TORSIONAL VIBRATION ISOLATOR ASSEMBLY FOR AN ENGINE

This application is a continuation-in-part application of Ser. No. 08/662,319, now abandoned, filed Jun. 13, 1996.

TECHNICAL FIELD

The present invention relates to a crankshaft gear torsional vibration isolator assembly for effectively minimizing the torsional vibrations transferred from a crankshaft to the crank gear and associated driven gear train by resiliently connecting the crank gear to the crankshaft.

BACKGROUND OF THE INVENTION

In internal combustion engines, an engine crankshaft is the primary source of torsional load. A crank gear is typically mounted on one end of the crankshaft for driving the engine gear train which includes the cam gear and camshaft among other gear driven elements. Throughout operation of the engine, the torque applied to the crankshaft varies due to, for example, the periodic firing of the engine's cylinders, the engagement and disengagement of driven elements such as a transmission, and the starting, stopping and variations in the speed of rotation of the crankshaft. These torque variations create torsional vibrations which may be transferred to the gear train of the engine often undesirably causing increased noise, premature engine wear and thus reduced gear life and possibly engine failure. In addition, since the engine drive gear train is used to drive engine components which are critical to proper engine operation, torsional vibrations transmitted through the gear train may adversely affect engine operation, such as the accuracy of fuel injection timing.

Many torsional variation absorbing or damping devices have been developed and used in different locations throughout an engine. It is well known to use a damper connected to one end of the crankshaft so as to rotate with the shaft for damping torsional vibrations generated by the crankshaft. Many of these dampers are tuned to approximately the first torsional natural frequency of the crankshaft to provide optimum damping at the natural frequency. Untuned dampers, such as viscous dampers, have an effect at all frequencies, but they provide the greatest reduction in crank torsional vibrations at the crank natural frequency. When the engine operating conditions, i.e. firing frequency or a harmonic of firing frequency, coincides with the natural frequency of the crankshaft, a resonance effect may be created which increases the amplitude of the torsional vibrations thus increasing the likelihood of damage to the crankshaft and other engine components and gears driven by the crankshaft. For example, U.S. Pat. Nos. 1,913,803; 2,926, 546; 4,172,510 and 5,188,002; French Patent No. 1,049,924; German Ref. No. 2115099; and U.K. Patent Application No. 2173879 all disclose various types of torsional vibration dampers mounted on a shaft including tuned rubber dampers and viscous type dampers.

Another manner of reducing torsional vibrations in an engine drive train is to use a coupling between a cam gear and the camshaft. For example, U.S. Pat. No. 5,017,178 discloses a resilient coupling apparatus for connecting a ring gear to a camshaft. The coupling includes sets of spring-biased pistons spaced circumferentially around a plate member and mounted in respective bores. Lubrication fluid in the respective bores becomes trapped upon movement of the pistons to viscously dampen the pistons and thus dampen the varying loads transferred to the camshaft from the ring gear or vice versa. However, the use of springs, pistons and a lubrication circuit integrated into a gear connection creates an excessively complex and costly device. Moreover, this device only provides a resilient connection between a camshaft and a ring gear which is driven by a timing gear mounted on a crankshaft and thus only dampens vibrations between these gears. As a result, torsional vibrations generated by the crankshaft will be transmitted to the timing gear and any other gears driven by the crankshaft and the timing gear, causing adverse effects such as increased noise and reduced gear life.

Various torque transmitting couplings capable of damping vibrations have been developed. For instance, U.K. Patent Publication No. 2153489 discloses a torsion absorber device for a friction clutch of a motor vehicle transmission which includes coil spring resilient devices for permitting relative movement between two parallel coaxially mounted disks. The absorber also includes an elastic member or rubber block positioned in an axial groove formed by complementary recesses in the outer surface of a hub and the inner surface of one of the disks mounted on the hub. The rubber block is designed to absorb vibrations transmitted through the connection. However, during compression, one half of the rubber block is subjected to a force in a first direction while an opposing force acts solely on the other half of the block. Therefore, this block is subject to high levels of shear force resulting in rapid block wear and possible failure over time. Also, the hub teeth contact the disk directly to provide an unabsorbed connection between the hub and the disk and therefore this elastic block connection does not provide a dampening connection during all engine operating conditions. In addition, this coupling does not resiliently couple a crank gear to an engine crankshaft and therefore does not prevent crankshaft induced torsional vibrations from reaching an engine drive train.

Russian Patent Publication No. 591637 discloses a shock-absorbing torque transmission coupling for connecting two shafts positioned end-to-end which includes a central shaft having radial vanes extending into respective recesses formed in an outer coupling surrounding the central shaft. Resilient elements in the form of bellows filled with a rubber-like substance are positioned on both sides of each vane between the vane and the recess wall. The bellows function to damp torque vibrations between the connected shafts. U.S. Pat. Nos. 2,012,012 and 2,446,942 disclose similar devices using rubber elements positioned between engaging portions of two couplings to eliminate torsional vibration in the shafts. However, the dampeners disclosed in these references do not resiliently couple a crank gear to an engine crankshaft and therefore does not prevent crankshaft induced torsional vibrations from reaching an engine drive train.

German Patent Publication Nos. 837,343 and 536,684 each appear to disclose torsional vibration dampers or resilient couplings for connecting two coaxial shafts wherein extensions formed on one shaft engage unsupported resilient webs attached to the other shaft. However, these devices rely on the unsupported portion of the resilient elements to transmit the rotative force to the other shaft thus placing a large bending forces on the elements in high load conditions. As a result, the resilient elements are likely to be prone to excessive wear and possibly failure rendering the coupling inoperable. Moreover, this design relies on the connection of the resilient elements to one of the shafts resulting in increased assembly costs and possible disengagement and thus failure of the coupling. In addition, these couplings do not resiliently couple a crank gear to an engine crankshaft and thus do not function to minimize the torsional vibrations in crank gear and associated drive train.

U.S. Pat. No. 4,834,041 to Valev discloses a resilient coupling connecting an auxiliary drive shaft to one end of a crankshaft. The auxiliary drive shaft is used to drive various auxiliary devices such as a generator, a water pump or a fan. Valev also appears to disclose the use of a torsional damper mounted on the end of the crankshaft. However, the auxiliary drive does not drive engine components critical to engine operation, such as fuel injectors and therefore, the resilient coupling does not function to minimize torsional vibrations to ensure proper engine operation, such as fuel injection timing. In addition, this coupling does not resiliently couple a gear to an engine crankshaft and thus does not reduce gear noise and extend gear life.

The technical article PA6-280 by Pielstick appears to disclose a main pinion, i.e. crank gear, resiliently connected to, and driven by, an engine crankshaft via a tuned elastomer type vibration damper. The main pinion is driven directly off the damper inertia ring. The damper appears to include semi-cylindrical resilient members positioned between inner and outer shaft rings located at one end of the crankshaft. The damper functions both as a torsional vibration damping device and an isolator or absorber for minimizing the vibrations transmitted to the main pinion. However, by integrating the damping and isolating functions into a single structure, this damper is incapable of adequately functioning as an isolator for protecting the main pinion and downstream gear train from torsional vibrations at all engine operating conditions. This rubber or elastomer type damper must be tuned to approximately the natural frequency of the crankshaft to permit the damper to dampen the relatively large torsional vibrations caused by resonance when the engine operates at or near the natural frequency. However, when the engine operates below the natural frequency, the damper will not sufficiently function to dampen vibrations but will undesirably transmit torsional vibrations to the main pinion and the timing gear train. Moreover, when the engine operates at approximately the natural frequency, the motion of the damper inertia ring should actually amplify the crankshaft torsional vibrations. The torsional activity of the damper inertia ring is directly applied to the crank gear, adversely affecting engine operation, increasing gear wear and gear noise, and possibly causing gear or shaft failure.

U.S. Pat. No. 1,649,426 discloses a means for preventing the vibrations of the crankshaft from being imparted to a timing chain via a timing gear mounted on the crankshaft which includes an intermediate resilient torque transmitting material, i.e. rubber, positioned in the connection of timing gear to the crankshaft. The rubber material completely fills the space provided between lugs extending outwardly from the crankshaft and inwardly extending lugs formed on the timing gear. This design also uses a friction plate to dampen vibrations experienced by the timing gear by frictionally engaging the timing gear thus assisting in maintaining the proper timing and functioning of parts driven from the timing gear. However, the rubber material completely fills the space between the timing gear and the crankshaft thus restricting the deformation of the rubber material. As a result, use of rubber material having sufficiently high resiliency characteristics necessary for providing sufficient torsional vibration absorption would undesirably permit excessive relative movement between the crankshaft and timing gear resulting in unacceptable timing error while reducing the durable life of the material. On the other hand, use of a resilient material of sufficient stiffness to maintain timing error within acceptable limits would be incapable of adequately absorbing torsional vibrations.

Consequently, there is a need for a simple yet effective crankshaft gear torsional vibration isolator assembly capable of effectively minimizing the transmission of torsional vibrations to the engine's timing gear train throughout all engine operating conditions while maintaining the functional timing relationship between the crankshaft and camshaft.

SUMMARY OF THE INVENTION

It is an object of the invention, therefore, to overcome the disadvantages of the prior art and to provide a crankshaft gear torsional vibration isolator assembly for an engine capable of effectively and reliably minimizing torsional vibrations transmitted from the crankshaft to the engine gear train throughout all engine operating conditions.

It is another object of the present invention to provide a crankshaft gear torsional vibration isolator assembly which isolates the crank gear from torsional vibrations transmitted by the crankshaft.

It is yet another object of the present invention to provide a crank gear torsional vibration isolator assembly which minimizes the noise generated from an engine gear train.

It is a further object of the present invention to provide a crank gear torsional vibration isolator assembly which reduces the load on gears in an engine gear train and thus reduces the size and costs of gears.

It is a still further object of the present invention to provide an engine drive train including a crank gear torsional vibration isolator assembly which dampens torsional vibrations while also effectively minimizing the transmission of torsional vibrations to the crank gear and downstream gears throughout all engine operating frequencies.

Still another object of the present invention is to provide an engine drive train including a torsional vibration isolator assembly which absorbs torsional vibrations transmitted from the crankshaft before reaching a crank gear thereby isolating the crank gear from the torsional vibrations while minimizing the relative rotation, and thus maintaining an optimum positional relationship between the crank gear and the crankshaft to ensure the proper timing of engine operations.

Yet another object of the present invention is to provide an improved engine drive train which absorbs torsional vibrations transmitted from the crankshaft before reaching a crank gear while effectively controlling gear rattle in the engine gear train connected to the crank gear thus minimizing gear noise and impact loads.

These and other objects are achieved by providing a crank gear torsional vibration isolator assembly for damping torsional vibrations in an internal combustion engine including a crankshaft having a natural frequency and a crank gear connected to the crankshaft for transmitting a drive force to an associated engine gear train, comprising an isolator connector for resiliently connecting the crank gear to the crankshaft and absorbing torsional vibrations transmitted from the crankshaft so as to minimize the torsional vibrations transmitted from the crankshaft to the crank gear and a non-linear spring device for permitting a limited predetermined amount of relative rotational movement between the crankshaft and the crank gear while substantially preventing further relative rotational movement greater than said limited predetermined amount of relative rotational movement to ensure accurate control of engine operations by the associated engine gear train. The isolator may include a plurality of resilient elements capable of absorbing torsional vibrations when the engine is operating at a frequency below the natural frequency of the crankshaft. Also, the isolator may include an inner drive ring connected to the crankshaft and an outer drive ring positioned annularly around the inner drive ring. The inner drive ring and the outer drive ring may each include a plurality of radial projections forming a plurality of recesses between each radial projection for receiving respective radial projections from the other drive ring. The resilient elements may be positioned in a respective cavity formed by the recesses adjacent the radial projections. For example, each of the radial projections may include two radial side surfaces and one of the resilient elements may be positioned in continuous abutment against each radial side surface. In this manner, each resilient element is positioned in compressive abutting relationship between the opposing radial side surfaces of respective radial projections from the respective rings. Relative rotational movement of the driving ring and the driven ring may cause compression of the resilient elements which will change the characteristic dimensions of the resilient elements while maintaining the volume of each element. The non-linear spring device may include an expansion volume portion of at least one of the of cavities positioned adjacent the resilient element for permitting relative rotational movement between the driving and driven rings. The expansion volume is of a predetermined volume capable of being fully occupied by the expanded portion of a resilient element upon a predetermined limited amount of relative rotational movement between the driving and driven rings during operation of the engine, thereby substantially preventing further relative rotational movement. The crankshaft may include a second end opposite the first end and the crank gear may be positioned axially along the crankshaft between the damper and the second end of the crankshaft. Also, the damper and the isolator may be positioned in a common plane transverse to a longitudinal axis of the crankshaft. In addition, the isolator may be positioned radially outwardly from the longitudinal axis of the crankshaft between the crank gear and the damper. The damper may be any type of damper appropriate for reducing the crankshaft torsional vibrations such as a viscous type damper or a rubber-type damper. The isolator may be capable of absorbing/isolating torsional vibrations of the crankshaft when the engine operates at and below approximately the natural frequency of the crankshaft so as to minimize the torsional vibrations transmitted from the crankshaft to the crank gear. The isolator assembly may include a damper connected to a first end of the crankshaft for damping torsional vibrations occurring at the natural frequency of the crankshaft as well as other frequencies.

DETAILED DESCRIPTION OF THE INVENTION

Figure 1:
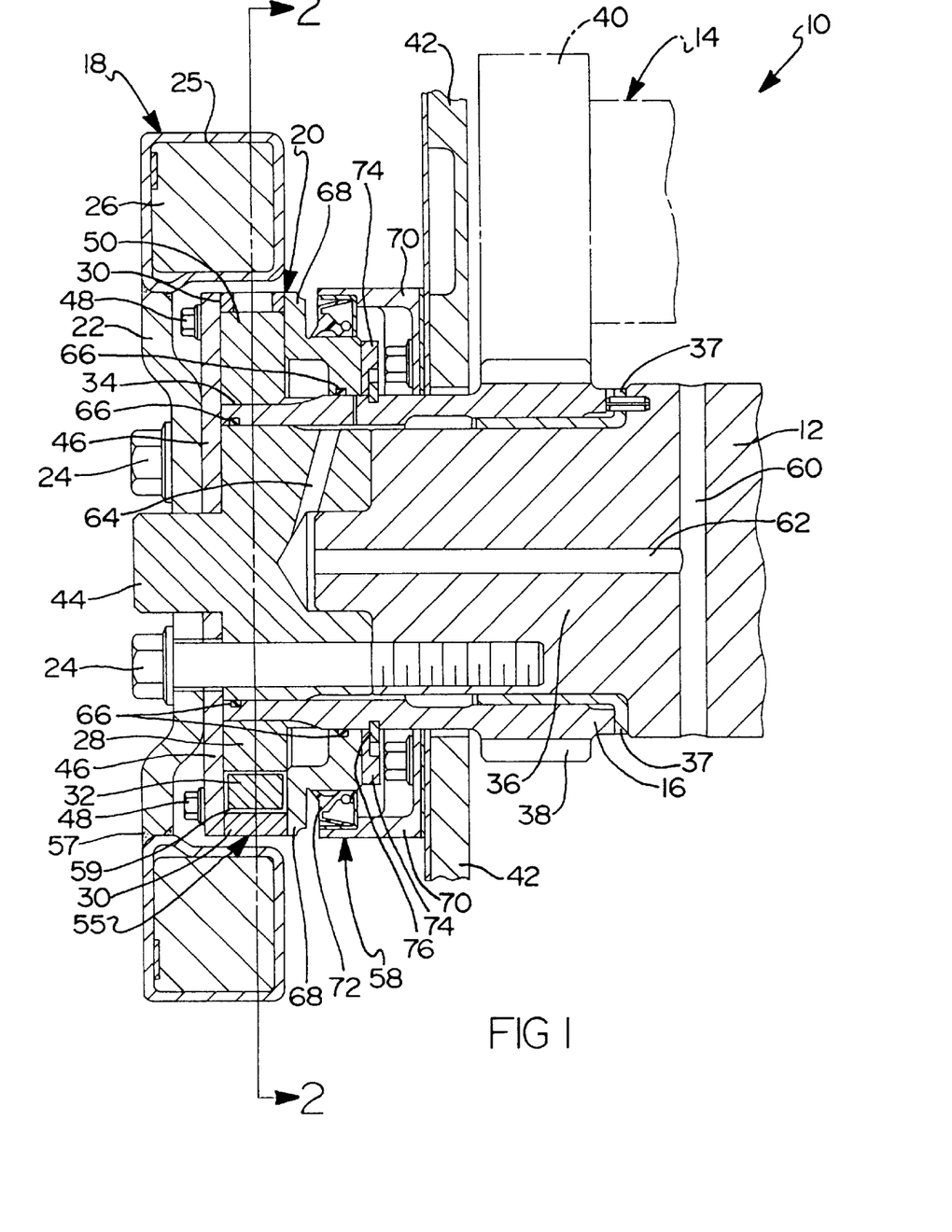
FIG. 1 is a cross-sectional side view of the crankshaft gear torsional vibration isolator assembly of the present invention mounted on an engine crankshaft.

Referring to FIG. 1, the improved crankshaft gear torsional isolator assembly of the present invention indicated generally at 10 is designed to be mounted on one end of a crankshaft 12 of an engine (not shown). Crankshaft 12 rotates to deliver a driving force to an engine gear train 14 which in turn operates various engine components, such as fuel injectors and cylinder valves critical to proper engine operation. Crankshaft 12 drives engine gear train 14 via a crankshaft, or crank, gear 16 mounted on the end of crankshaft 12.

Crank gear torsional vibration isolator assembly 10 generally includes a crank gear isolator 20 for minimizing the transmission of torsional vibrations from crankshaft 12 to crank gear 16 and engine gear train 14. Although not necessary for some types of engines, typically, the assembly 10 will also include a torsional vibration damper 18 for effectively damping or minimizing the magnitude of torsional vibrations transmitted through crankshaft 12.

Crank gear 16 is generally cylindrical in shape and extends over a crank nose 36 formed on the end of crankshaft 12. The inner end of crank gear 16 includes a plurality of gear teeth 38 extending radially from crank gear 16 around its entire circumference. Gear teeth 38 of crank gear 16 mesh with at least one driven gear 40 of gear train 14 and typically directly engages two or more driven gears for transferring a driving force to, for example, a cam shaft, an idler gear and/or a fuel pump drive gear. Driven gear 40 may be a scissors gear for removing lash in the gear train as discussed hereinbelow with respect to FIG. 7. An annular sleeve bearing 37 is positioned between the crank nose 36 and the inner end of crank gear 16 opposite gear teeth 38 to provide a bearing surface for relative movement between crank gear 16 and crankshaft 12. The cylindrical portion of crank gear 16 extends outwardly toward the end of crankshaft 12 through a gear housing wall 42. The outer end of crank gear 16 overlaps a torsional vibration damper mounting adapter 44 designed to facilitate mounting of vibration damper 18 and isolator 20 on the end of crankshaft 12. Adapter 44 is connected to the end of crankshaft 12 via mounting bolts 24.

Torsional vibration damper 18 may be any conventional vibration damper capable of effectively limiting or damping torsional vibrations and thus limiting the stress on crankshaft 12. The torsional vibrations occurring in crankshaft 12 result from the forces on the crankshaft driving system created by the periodic combustion events occurring in the engine cylinders and from the inertia of the reciprocating parts of the crankshaft and engine. At certain critical engine speeds, a harmonic of the operating frequency of the engine approximately corresponds to the natural frequency or crank resonance of the crankshaft resulting in torsional vibrations of large amplitudes. Thus, torsional vibration damper 18 is specifically designed to dampen torsional vibrations at the natural frequency of the crankshaft. Torsional vibration damper 18 may be of a viscous type which includes a flange body 22 rigidly mounted to the end of crankshaft 12 by mounting bolts 24. Flange body 22 forms an annular chamber 25 containing an inertial body 26 rotatably or resiliently mounted therein for movement relative to flange 22 during rotation of damper 18. A highly viscous fluid is positioned in chamber 25 in the gaps and interstices formed in and around inertial body 26. The relative movements which occur between the flange body and the inertial body result in high sheering forces in the interstices and thus produce the desired damping action. Alternatively, torsional vibration damper 18 may be of the tuned rubber-type damper of a conventional design capable of damping torsional vibrations at the natural frequency of crankshaft 12. Typically, rubber type dampers are specifically tuned or designed with a natural frequency approximately equal to the natural frequency of the crankshaft. Also, torsional vibration damper 18 may by a pendulum-type damper which converts potential energy into kinetic energy. In any embodiment, torsional vibration damper 18 functions to minimize or dampen the amplitude of the torsional vibrations occurring throughout engine operation and especially during crank resonance when a harmonic of the engine operating frequency approaches and equals the natural frequency of the crankshaft.

Figure 2:
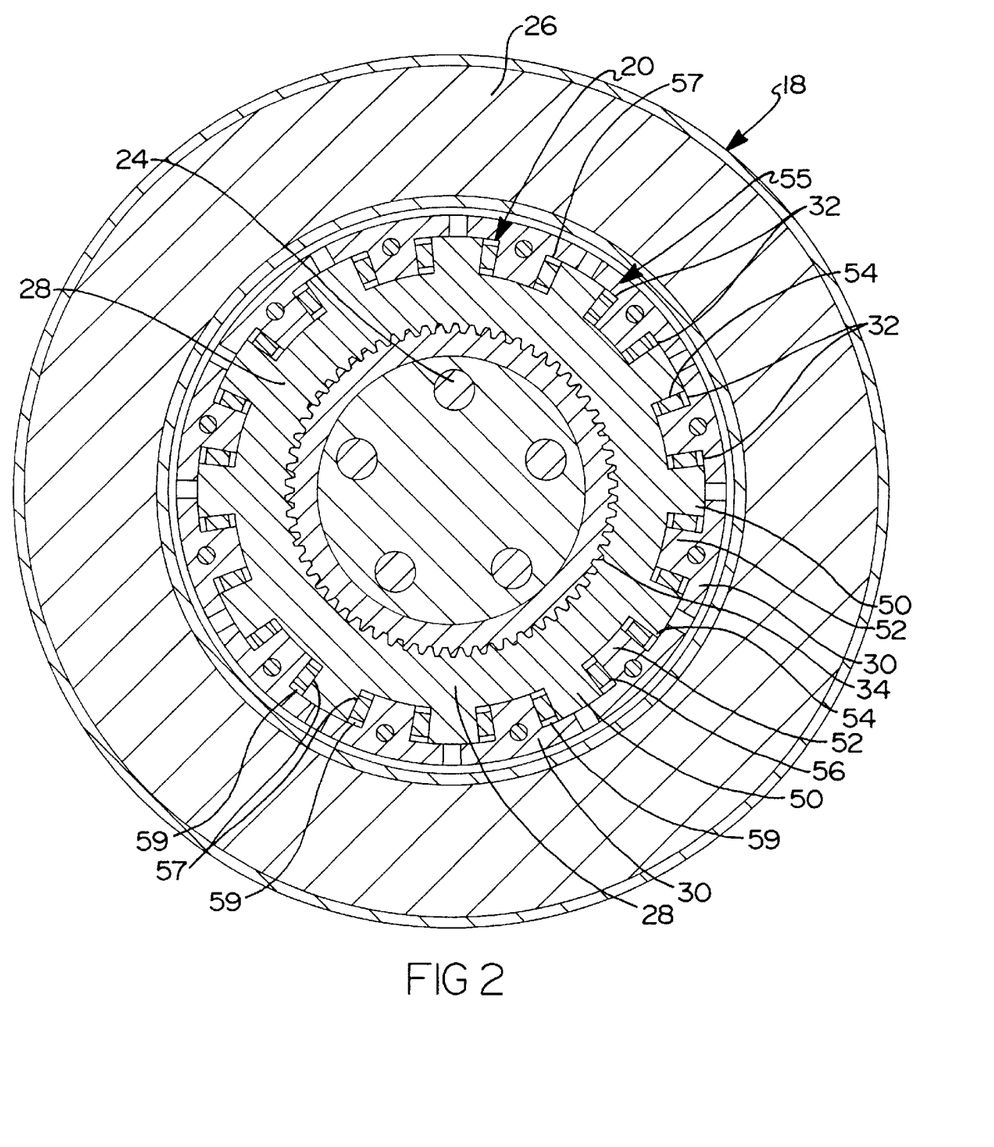
FIG. 2 is a cross-sectional end view of the crankshaft gear torsional vibration isolator assembly taken along plane 2—2 of FIG. 1 showing the isolator of the present invention.

Crank gear isolator 20 provides a resilient connection between crankshaft 12 and crank gear 16 for absorbing torsional vibrations transmitted from crankshaft 12 thereby isolating crank gear 16 and the remainder of gear train 14 from the torsional vibrations. Referring to FIGS. 1 and 2 crank gear isolator 20 includes an inner drive ring 28 mounted on crank gear 16, an outer drive ring 30 resiliently mounted on inner drive ring 28 and resilient elements 32 providing the resilient connection between inner and outer drive rings 28 and 30. Inner drive ring 28 extends around, and is connected to, one end of crank gear 16 by an annular spline connection 34. Outer drive ring 30 is rigidly connected to crank nose 36 via a drive plate 46 positioned between flange body 22 of damper 18 and adapter 44. Mounting bolts 24 extend through respective holes in drive plate 46 to secure flange body 22, drive plate 46 and adapter 44 on the end of crank nose 36. Outer drive ring 30 is connected to an outer circumferential portion of drive plate 46 via a plurality of fasteners 48 which extend through apertures spaced around the circumference of drive plate 46 into complimentary apertures formed in outer drive ring 30.

Inner drive ring 28 and outer drive ring 30 include respective radial projections or teeth 50 and 52, respectively. Radial projections 50 extend outwardly from drive ring 28 and are evenly spaced around the circumference of ring 28 to form recesses 54 separating radial projections 50. Likewise, outer drive ring 30 includes radial projections 52 extending inwardly from the inner surface of outer drive ring 30 and are spaced evenly around the circumference of outer drive ring 30 so as to correspond to respective recesses 54. Also, radial projections 52 of outer drive ring 30 form recesses 56 similar to recess to 54 for receiving radial projections 50 of inner drive ring 28. Radial projections 50 and 52 are sized smaller than respective recess 56, 54 so as to form a cavity in the recesses on both sides of radial projections 50, 52 for receiving resilient elements 32.

Resilient elements 32 are generally rectangularly shaped and formed of a resilient elastomer material. The elastomer material used to form resilient elements 32 must possess enough resiliency to provide the necessary damping or absorbing qualities needed to isolate crank gear 16 from the torsional vibrations transmitted from crankshaft 12. However, the elastomer material must also be rigid enough to maintain the relative rotational position between crankshaft 12 and crank gear 16 so as to predictably and reliably operate other engine components in timed relationship to crankshaft rotation. Thus, with radial projections 50 of inner ring 28 engaging respective recesses 56 formed in outer drive ring 30, each resilient element 32 is pressed into a respective cavity 57 formed between radial projections 50 and 52.

Resilient elements 32 in combination with cavities 57 form a non-linear spring, or stiffness, device, indicated generally at 55, which permits torsional vibration absorption while limiting the relative rotational movement between the crankshaft 12 and crank gear 16. Resilient elements 32 are sized smaller than cavity 57 to create an unfilled expansion volume or space 59 in each cavity when elements 32 are installed. Preferably, volume 59 includes a space positioned radially on both sides of resilient element 32 as shown in FIG. 2. During the operation, resilient elements 32 deform while both transmitting torque from outer drive ring 30 to inner ring 28 and absorbing torsional vibrations. When the deformation of resilient elements 32 is sufficient to fill volume 59, the stiffness of elements 32 increases dramatically thus preventing any further significant relative movement between the outer drive ring 30 and inner ring 28 while still providing torsional vibration damping. As a result, this feature limits the timing error between the crankshaft and the downstream camshaft due to the relative movement while permitting optimum absorption of vibrations prior to filling volume 59.

Several factors must be considered in designing the present isolator to achieve optimum torsional vibration damping while limiting the timing error. These factors include an amount of pre-compression applied to the elements 32 upon assembly in cavity 57; the amount of relative rotational movement permitted between the inner and outer rings before elements 32 fill cavity 57 (hereinafter referred to as "going solid"); the static and dynamic stiffness of the resilient material of elements 32; and the damping ability of the resilient material. Various combinations of these characteristics may used to create an isolator capable of effectively limiting the relative movement, and thus the timing error, between the crankshaft and the crank gear (and thus cam shaft) while effectively isolating the crank gear from the crankshaft. However, in the preferred embodiment, the resilient elements are sized as follows: 9.4 mm×19.1 mm×5.1 mm (height×width×thickness). The static stiffness of elements is $5.0 \times 10^5$ in-lb/rad. Each cavity 57 is designed with a thickness dimension of 3.5 degrees. The resilient elements 32, having a thickness of 5.1 mm at an average radius of 75.6 mm, would occupy 3.9 degrees. As a result, each resilient element 32 would be under 10% pre-compression upon assembly. The volume of the space available for each rubber element is 3.5 degrees×20.4 mm (length of cavity 57)×11.2 mm (width)=799.7° mm². The volume of each resilient element 32 is 3.9 degrees×9.4×19.1=689.28° mm². Therefore, a resilient element under compression will expand to fill cavity 57 so as to go solid when the element is deformed by 14% in excess of the pre-compression causing 0.5 degrees movement between outer drive ring 30 and inner ring 28. After permitting 0.5 degrees movement and going solid due to the volume constraint, the stiffness of the elements increases by, for example, a factor of 10 or higher preventing any further significant compression of the elements.

Figure 5:
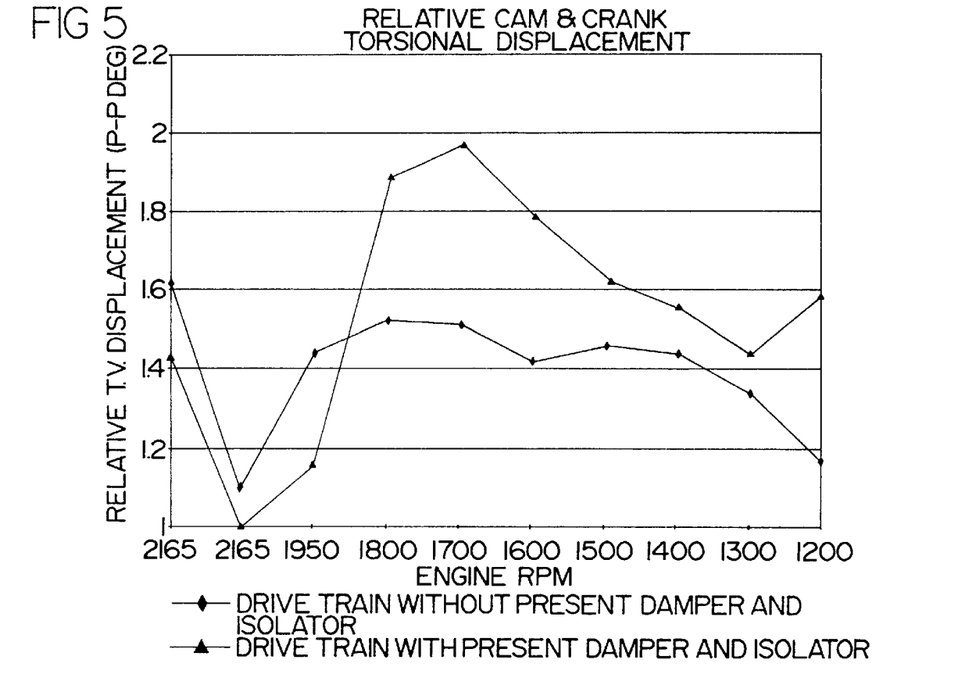
FIG. 5 is a graph showing the relative torsional displacement of the cam and crankshafts at various engine speeds and the ability of the present isolator assembly to minimize relative rotation, and thus timing error, between the cam and crankshafts.

Therefore, this design provides accurate timing for the downstream camshaft by causing the elements to go solid after a predetermined deformation to limit the movement between the crankshaft and crank gear. Thus, in the preferred embodiment, the maximum timing error for the engine with the present crank isolator is +/−0.5 degrees. FIG. 5 compares the crankshaft to camshaft timing error of an engine with and without the present isolator assembly. At the worst case condition, the isolator increases timing error by 0.5 degrees peak-to-peak or +/−0.25 degrees. This is well within the isolator design limit of +/−0.5 degrees. Also, since the pre-compression of 10%, i.e. 0.35 degrees, is greater than the 0.25 degrees of motion experienced by the resilient elements, the resilient material, i.e. rubber, will not totally decompress thus maximizing the durability and long life of the rubber material.

Figure 6:
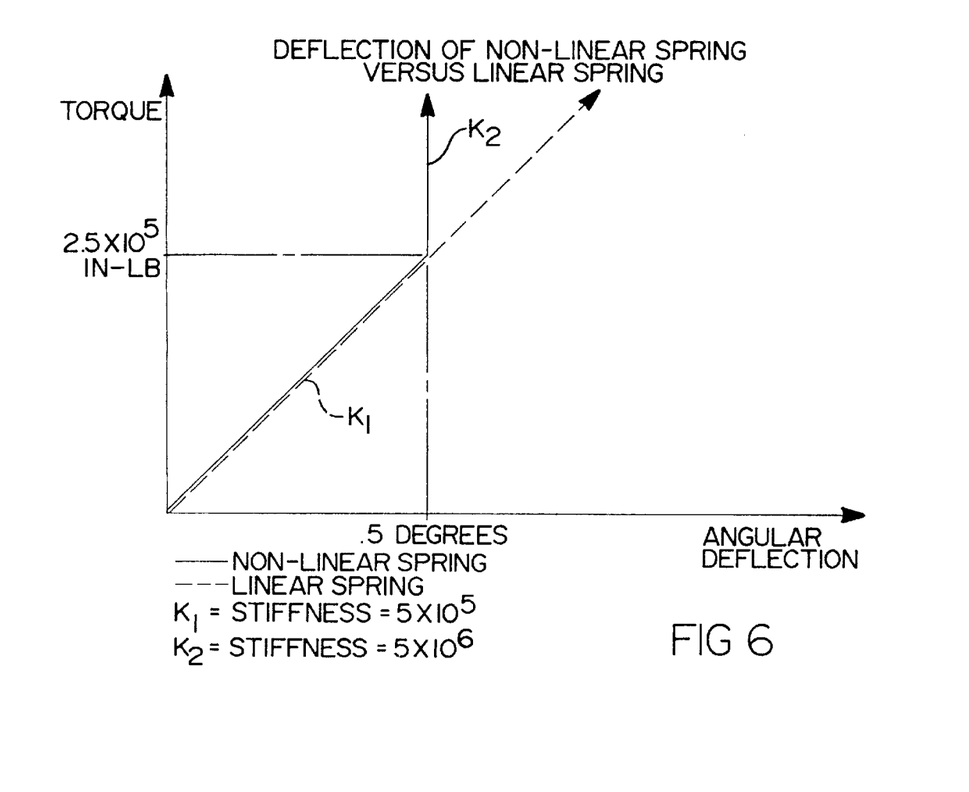
FIG. 6 is a graph comparing the load-induced deflection of the non-linear spring device of the present invention with a linear spring.

The non-linear spring device 55 of the present invention could be formed from other resilient devices such as Belleville washers, leaf springs, coil springs or any combination thereof as long as the particular device is specifically designed to permit an initial range of relative movement between the outer drive 30 and inner ring 28 while limiting the relative movement to a maximum predetermined amount. As shown in FIG. 6, the non-linear spring device 55 permits increased deflection of resilient elements 32 in proportion to an increased load or torque applied either from the crankshaft or the crank gear. However, upon the application of a predetermined level of torque corresponding to a maximum desired amount of deflection and thus relative rotational movement, resilient elements 32 go solid thus preventing any further significant deflection. As a result, non-linear spring device 55 ensures accurate control of downstream engine operations such as fuel injection timing. In comparison, an isolating device having linear spring characteristics would permit continued angular displacement/deflection causing unacceptable variations in the control of, for example, the accuracy of fuel injection timing. In the example of FIG. 6, the stiffness of the non-linear spring device 55 is $5 \times 10^5$ in-lb/rad during an initial deflection period which may be the same as a linear spring. However, when a load/torque of above $2.5 \times 10^5$ in-lb is applied, the stiffness of non-linear spring device 55 increases to $5 \times 10^6$ in-lb/rad as resilient elements 32 go solid. This stiffness prevents further significant deflection and thus relative rotational movement whereas the linear spring would continue to permit relative rotational movement at higher loads.

An oil seal assembly 58 may be provided between gear housing wall 42 and isolator 20 to prevent oil from escaping the gear housing. Lubricating fluid may be provided via passages 60, 62 and 64 formed in crankshaft 12 and mounting adapter 44 to provide lubricating fluid to sleeve bearing 37. Lubricating fluid may also be directed to crank gear 16 and thus may escape the gear housing via the clearances between crank gear 16 and gear housing wall 42. Oil seal assembly 58, along with o-rings 66, prevents such oil leakage. Oil seal assembly 58 includes a seal cover 68 connected to outer drive ring 30 via fasteners 48 and a seal carrier 70 secured to gear housing wall 42 and extending outwardly therefrom. An annular oil seal 72 is mounted on seal carrier 70 and contacts the outer surface of seal cover 68 to form an annular seal. A thrust ring 74 is positioned between cover 68 and carrier 70 and secured to crank gear 16 by a snap ring 76. Thrust ring 74 assists in preventing axial movement of crank gear 16 along crank nose 36.

During operation, as crankshaft 12 rotates, torsional vibrations are created by the periodic forces on the crankshaft and the inertia of the drive train components. These torsional vibrations occur at varying degrees at all engine speeds and are amplified when the engine operates at a frequency corresponding to the natural frequency, or crank resonance, of the crankshaft. Torsional vibration damper 18 functions to dampen the torsional vibrations transmitted through the crankshaft 12 especially during those periods when the engine is operating at the natural frequency of the crankshaft thus preventing amplification of the torsional vibrations. Without such damping, crankshaft 12 would be subject to unnecessarily high torsional vibration, greatly increasing the stress on the crankshaft and crankshaft bearings possibly resulting in crankshaft failure. Thus, torsional vibration damper 18 serves an important function in damping torsional vibrations transmitted from the crankshaft. Simultaneously, crank gear isolator 20 absorbs torsional vibrations transmitted from the crankshaft thereby preventing transmission of the vibrations through crank gear 16 into the downstream gear train of the engine. As the crankshaft rotates, drive plate 46 and outer drive ring 30 correspondingly rotate to rotatably drive crank gear 16. As outer drive ring 30 vibrates due to torsional vibrations transmitted by crankshaft 12, resilient elements 32 will be correspondingly compressed and decompressed permitting slight relative movement between outer drive ring 30 and inner drive ring 28 resulting in a cushioning or energy absorbing effect which minimizes the quantity and magnitude of torsional vibrations transmitted to inner drive ring 28 and thus crank gear 16 and engine gear train 14.

Thus, the crank gear torsional vibration isolator of the present invention results in several important distinct advantages. First, when used in combination with a separate torsional vibration damper, the present invention permits the torsional damper to be specifically designed to optimally dampen torsional vibrations at the natural frequency of the crankshaft while also permitting isolator 20 to optimally isolate crank gear 16 from the torsional vibrations. Prior art assemblies which integrate the vibration damper and isolator into one rubber type damper for both damping torsional vibrations at the natural frequency at the crankshaft while attempting to provide a resilient connection between the crankshaft and crank gear, disadvantageously transmit the torsional vibrations through the crank gear at frequencies less than the natural frequency of the crankshaft and may even amplify the torsional vibrations during operation at the crankshaft natural frequency. Thus, the isolator assembly of the present invention, when used in combination a torsional damper, permits optimal crank gear isolating, at all operating frequencies of the engine independently of torsional vibration damping. Second, by minimizing the torsional vibrations transmitted to the crank gear, the present isolator assembly 10 reduces vibration induced gear noise. Third, by reducing the torsional vibrations experienced in the engine gear train, the present invention reduces the loads placed on the gears thus reducing gear wear thereby extending the life of the gears. Also, since the load on the gears is significantly reduced, the present invention permits the use of narrower gears resulting in reduced engine costs. Fourth, by positioning the isolator of the present invention between the crankshaft and crank gear, the present invention effectively dampens torsional vibrations to the entire engine drive train thus reducing gear noise and load throughout the entire gear train. Fifth, by selecting a resilient material with specific functional characteristics and designing cavity 57 with a particular size relative to the size of resilient element 32, the present isolator permits optimal torsional vibration absorption while minimizing the timing error by limiting the relative rotational movement of the crank gear and crankshaft.

Figure 3:
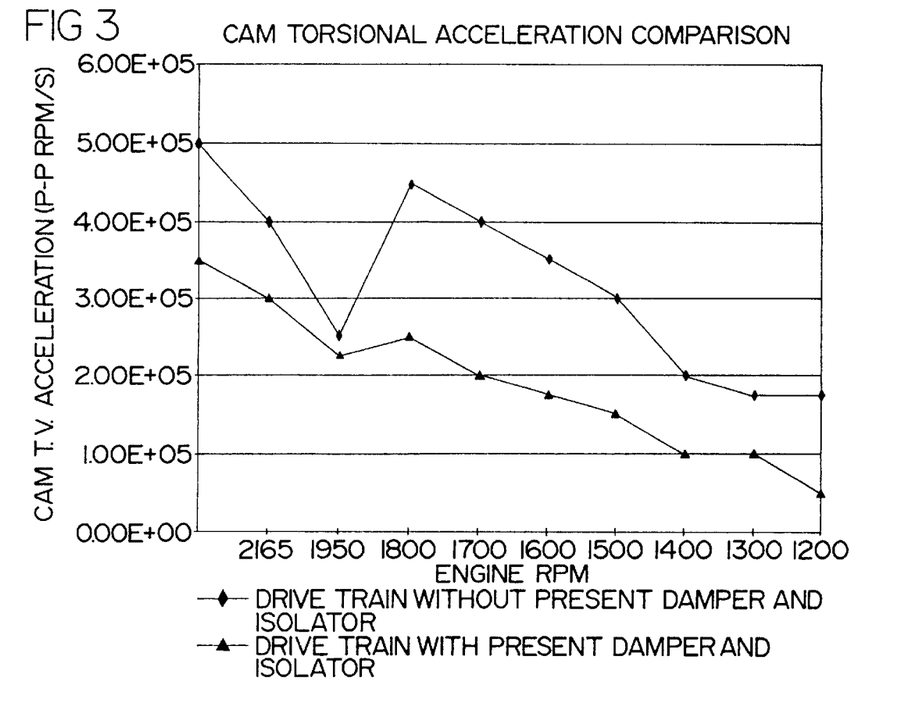
FIG. 3 is a graph showing the advantage of the present isolator assembly in decreasing torsional vibration experienced in the engine drive train.

The advantages of the present assembly in minimizing torsional vibrations in the engine drive train is illustrated in FIG. 3 which compares the torsional vibration acceleration experienced in a camshaft of a drive train having the present isolator assembly including a damper, with torsional vibration acceleration experienced in a camshaft of a drive train without the present isolator. As shown in FIG. 3, the present isolator assembly significantly reduces the torsional vibrations in the camshaft at all engine speeds, and especially at approximately 1700–1800 rpm. Torsional vibrations typically increase with engine speed and load. The torsional vibrations in the engine without the present assembly are the greatest at 1700–1800 rpm when both the speed and load are high. Thus, the maximum torsional vibration reduction by the present isolator assembly, for the particular engine tested, occurs around 1700–1800 rpm.

Figure 4:
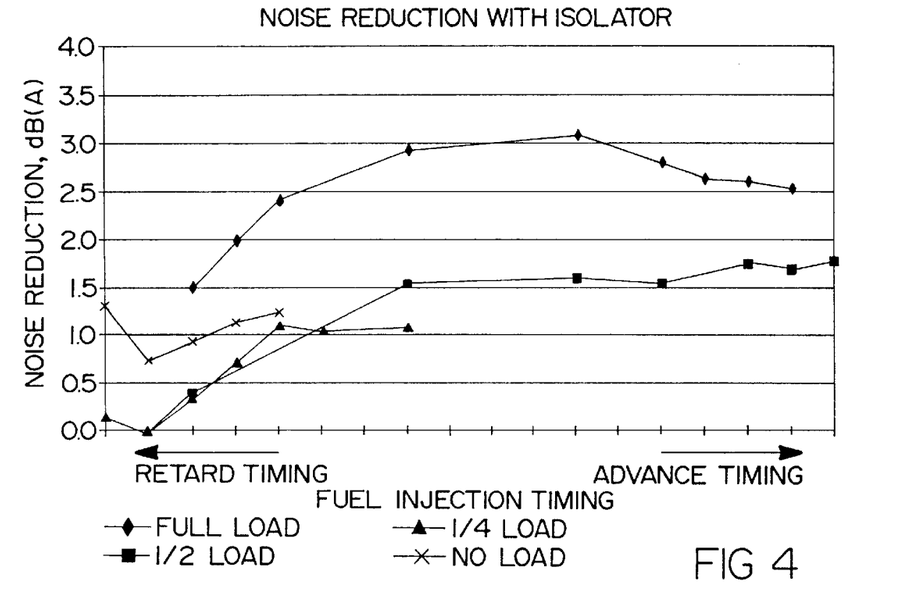
FIG. 4 is a graph showing the noise reduction capability of the isolator assembly of the present assembly at various engine operating loads and injection timing settings.

FIG. 4 illustrates the noise reduction capability of the present isolator assembly at various engine operating loads and injection timing settings. This data was obtained by comparing the noise levels of an engine without the isolator of the present assembly to an engine having the present isolator. FIG. 4 shows the average noise reduction resulting from noise levels detected one meter from the engine at several locations around the engine. The isolator assembly of the present invention, and specifically isolator 20, achieves up to 3 dB noise reduction at full load, and about 1.5 dB reduction at half load. Thus, the present assembly provides a significant sound quality improvement under load and a modest improvement under no load conditions.

Figure 7:
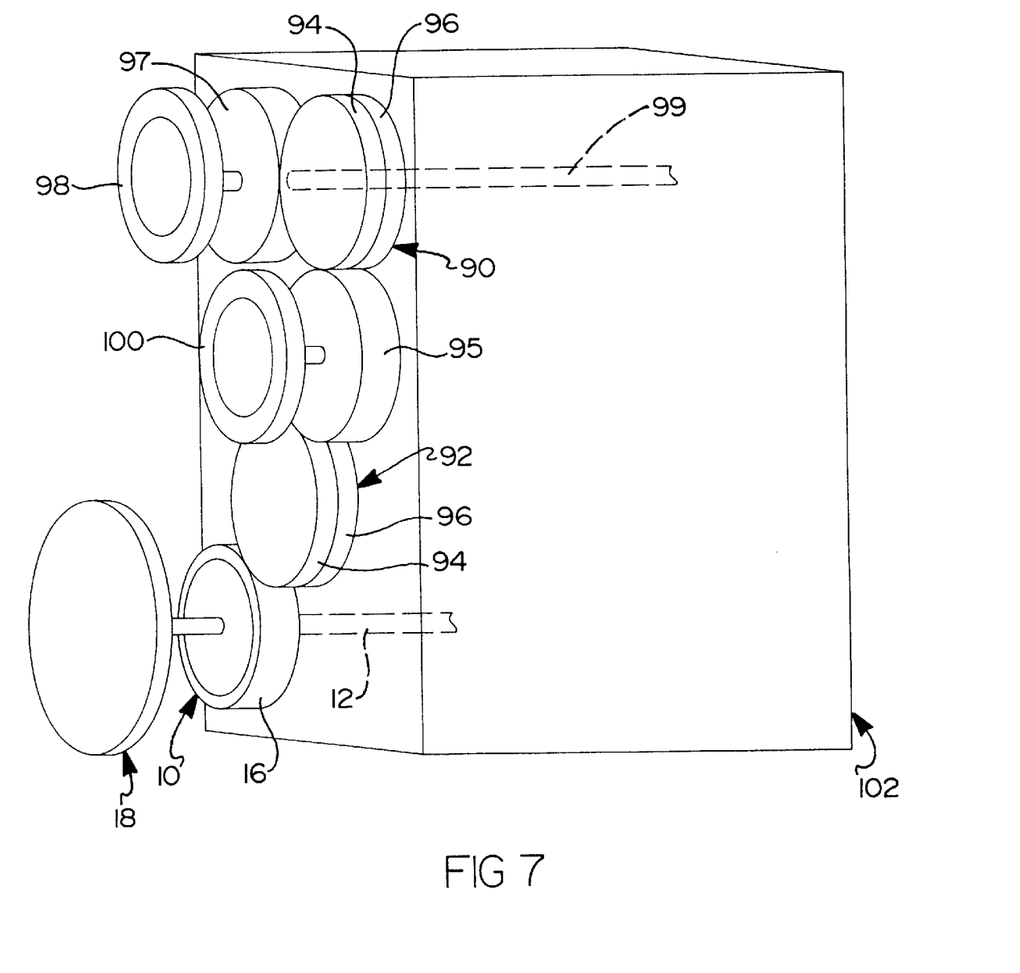
FIG. 7 is schematic of an engine including the present engine drive train of the present invention in combination with an engine timing gear train having lash control devices.

Referring now to FIG. 7, the improved crankshaft gear torsional isolator assembly of the present invention can be combined with one or more lash control devices 90, 92 positioned along the engine timing gear train serving an engine 102 to create an improved engine drive train which effectively minimizes torsional vibrations transmitted from the crankshaft to the engine gear train throughout all engine operating conditions while also controlling gear train noise at low load/low speed conditions. Crank gear 16 is resiliently mounted on crankshaft 12 using the crankshaft gear torsional isolator assembly of the present invention as discussed hereinabove with respect to FIGS. 1 and 2.

At low speed/low load conditions, the crankshaft rigid body motion, resulting from torsional vibrations induced by engine cylinder firings, causes the gears in the engine drive train to move relative to one another, i.e. backlash, resulting in a rattling noise and possibly high impact loads on the gear teeth. Lash control devices 90, 92 may be any conventional lash control gear arrangement, such as scissor gears, wherein two half gears 94, 96 are coaxially mounted and circumferentially spring-loaded creating a biasing or preloading effect in order to remove lash in the mesh between the gears. Lash control device 90 is positioned in meshing relationship between crank gear 16 and an intermediary gear 95 while lash control device 92 is positioned in meshing relationship between intermediary gear 95 and a cam gear 97 mounted on a camshaft 99 positioned to drive engine components, such as valves and injectors, in timed relationship relative to the rotation of crankshaft 12.

Figure 8:
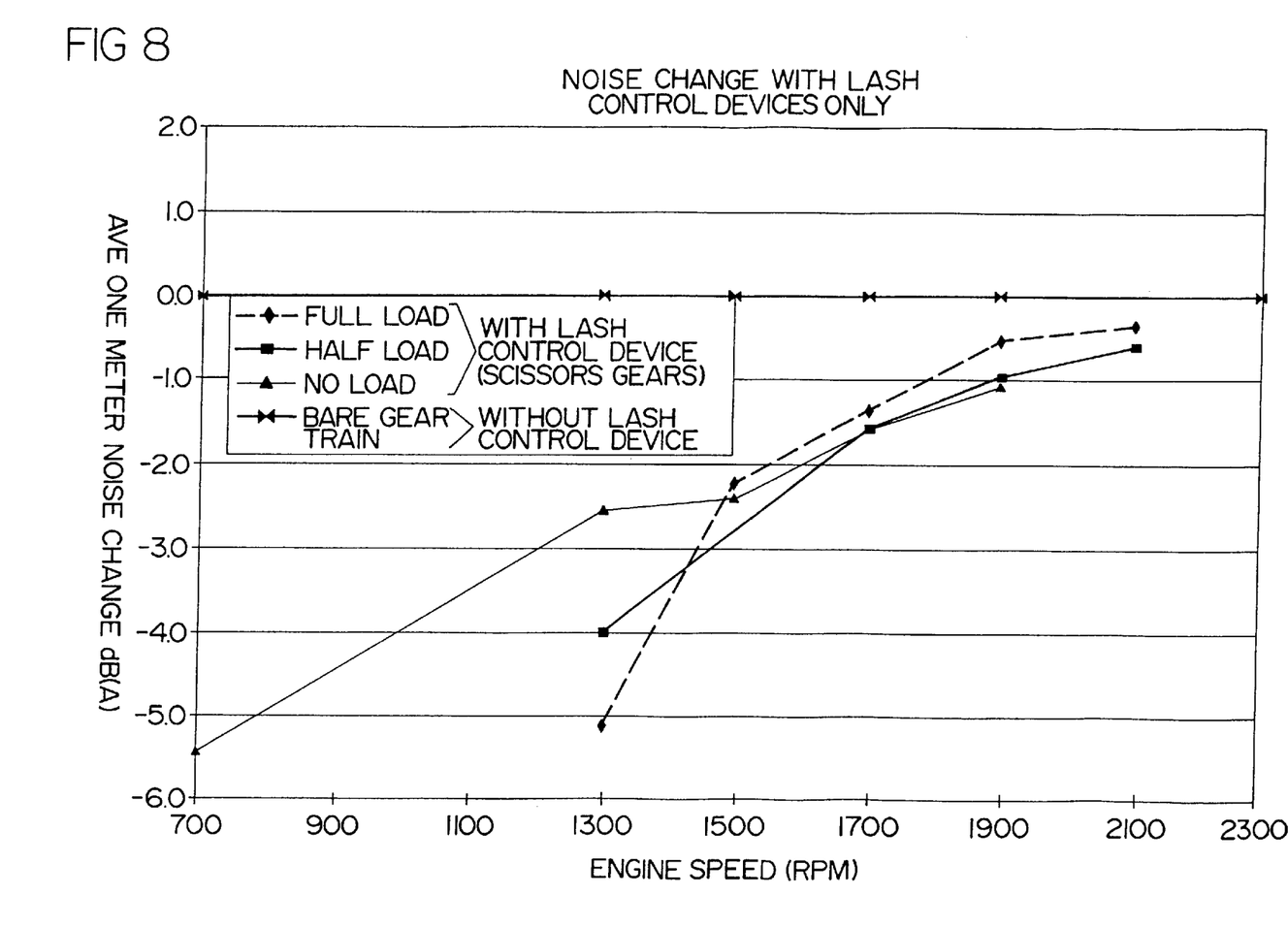
FIG. 8 is a graph showing the engine noise reduction at various engine loads due to scissors gears as compared to a bare engine having no lash control device.

By positioning the lash control devices 90, 92 in the timing gear train as shown in FIG. 7, lash can be removed in the entire timing gear train creating an improved engine drive train. The crankshaft gear torsional isolator assembly 10 and lash control devices 90, 92 function synergistically to optimally minimize gear noise. As shown in FIG. 8, lash control devices 90, 92 result in a significant reduction in engine noise at all load conditions, and especially at low engine speeds, compared to a bare timing gear train without any lash control. More importantly, when the lash control devices 90, 92 are combined with the engine drive train of the present invention, optimum noise reduction is achieved at both high and low engine speeds. Also, by reducing the torsional vibrations transferred from the crankshaft to the timing gear train, the engine drive train of the present invention advantageously reduces the torque, or preload, required in the lash control devices, thereby increasing the reliability and durability of the lash control devices. The timing gear train may also be provided with one or more torsional vibration damper 98, 100 for damping the torsional vibrations in the timing gear train to provide further reductions in gear noise.

INDUSTRIAL APPLICABILITY

The crank gear torsional vibration isolator assembly of the present invention may be used on any engine having a crankshaft and crank gear for driving an engine gear train associated with any vehicle or industrial equipment where effective damping of torsional vibrations and reductions in gear noise and gear impact load are desired.

We claim:

1. A crank shaft gear torsional vibration isolator assembly for dampening torsional vibrations in an internal combustion engine including a crank shaft and a crank gear connected to the crank shaft for transmitting a drive force to an associated engine gear train, comprising:

a driving ring for connection to the crank shaft, the driving ring including a plurality of radial recesses and projections;

a driven ring for connection with the crank gear, the driven ring being positioned annularly within the driving ring, the driven ring including a plurality of radial recesses and projections, each recess of the driven ring being positioned for accepting a radial projection of the driving ring and forming a plurality of cavities, each radial projection of the driven ring being positioned for acceptance by a recess of the driving ring forming a plurality of cavities;

resilient elements torsionally connecting the driving and driven rings, one of the resilient elements being positioned in each cavity, each resilient element having two radial side surfaces positioned in continuous abutting contact against a radial side surface of one of the radial projections of the driven or driving ring and against a radial side surface of the other driven or driving ring recesses, each resilient member having circumferential thickness less than one-half of the circumferential thickness of the driving ring radial projections or the driven ring radial projections, each of the resilient elements being prestressed circumferentially at least ten percent, each resilient member being positioned within the cavity such that there is a radially inward and radially outward expansion volume portions of the cavity, the volume portions circumferentially traversing the cavity and wherein the resilient elements act as nonlinear springs for permitting a limited predetermined amount of relative rotational movement between the crank shaft and the crank gear while substantially preventing further relative rotational movement greater than the limited predetermined amount of relative rotational movement to ensure accurate control of an engine operation by the associated engine gear train, and wherein relative rotational movement of the driving ring and the driven ring causes compression of at least one of the plurality of resilient elements to form expanded portions of the resilient element whereby the radially inward and radially outward expansion volumes have a predetermined volume capable of being fully occupied by the expanded portions of the resilient element upon the predetermined limited amount of relative rotational movement between the driving and driven rings during operation of the engine thereby substantially preventing further relative rotational movement.

2. The crankshaft gear torsional vibration isolator assembly of claim 1, wherein said resilient elements deform to fully occupy said expansion volume portion upon approximately 0.5 degrees relative movement between said driving ring and said driven ring.

3. An engine drive train including a crankshaft gear torsional vibration isolator assembly for damping torsional vibrations in an internal combustion engine, comprising:
   a crankshaft mounted for rotation and having a natural resonant frequency;
   a crank gear connected to the crankshaft for transmitting a drive force to an associated engine gear train, said engine gear train including a camshaft for operating engine components in timed relationship to the rotation of said crankshaft, a cam gear mounted on said camshaft and an intermediary gear for transferring the drive force from said crank gear to said cam gear, further including a lash controller positioned along the engine gear train for minimizing the lash between said intermediary gear and said crank and cam gears, said lash controller including a first set of scissors gears positioned in meshing relationship between said crank gear and said intermediary gear and a second set of scissors gears positioned in meshing relationship between said intermediary gear and said cam gear;
   a damper connected to a first end of said crankshaft for damping torsional vibrations transmitted by said crankshaft, said damper capable of damping torsional vibrations occurring at said natural resonant frequency of said crankshaft; and
   an isolator for resiliently connecting said crank gear to said crankshaft, said isolator capable of absorbing torsional vibrations transmitted from said crankshaft when the engine operates at approximately said natural resonant frequency of said crankshaft so as to minimize the torsional vibrations transmitted from said crankshaft to said crank gear.

4. An engine drive train including a crankshaft gear torsional vibration isolator assembly for damping torsional vibrations in an internal combustion engine, comprising:
   a crankshaft mounted for rotation and having a natural resonant frequency;
   a crank gear connected to the crankshaft for transmitting a drive force to an associated engine gear train,
   a damper connected to a first end of the crankshaft for damping torsional vibrations transmitted by said crankshaft, the damper capable of damping torsional vibrations occurring at the natural resonant frequency of the crankshaft; and
   an isolator for resiliently connecting the crank gear to the crankshaft, the isolator capable of absorbing torsional vibrations transmitted from the crankshaft when the engine operates at approximately the natural resonant frequency of the crankshaft so as to minimize the torsional vibrations transmitted from the crankshaft to the crank gear;
   a driving ring for connection to the crankshaft, the driving ring including a plurality of radial recesses and projections;
   a driven ring for connection with the crank gear, the driven ring being positioned annularly within the driving ring, the driven ring including a plurality of radial recesses and projections, each recess of the driven ring being positioned for accepting a radial projection of the driving ring and forming a plurality of cavities, each radial projection of the driven ring being positioned for acceptance by a recess of the driving ring forming a plurality of cavities;
   spring means in the form of resilient elements torsionally connecting the driving and driven rings, one of the resilient elements being positioned in each cavity, each resilient element having two radial side surfaces positioned in continuous abutting contact against a radial side surface of one of the radial projections of the driven or driving ring and against a radial side surface of the other driven or driving ring recesses, each resilient member having circumferential thickness less than one-half of the circumferential thickness of the driving ring radial projections or the driven ring radial projections, each of the resilient elements being prestressed circumferentially at least ten percent, each resilient member being positioned within the cavity such that there is a radially inward and radially outward expansion volume portions of the cavity, the volume portions circumferentially traversing the cavity and wherein the resilient rotational movement between the crankshaft and the crank gear while substantially preventing further relative rotational movement greater than the limited predetermined amount of relative rotational movement to ensure accurate control of an engine operation by the associated engine gear train, and wherein relative rotational movement of the driving ring and the driven ring causes compression of at least one of the plurality of the resilient elements to form expanded portions of the resilient element whereby the radially inward and radially outward expansion volumes have a predetermined volume capable of being fully occupied by the expanded portions of the resilient element upon the predetermined limited amount of relative rotational movement between the driving and driven rings during operation of the engine thereby substantially preventing further relative rotational movement.

5. The engine drive train of claim 4, wherein said isolator is capable of absorbing torsional vibrations when the engine is operating at a frequency below said natural resonant frequency of said crankshaft.

6. The engine drive train of claim 4, wherein said damper is a viscous type damper.

7. The engine drive train of claim 4, wherein said spring means is non-linear.

8. The engine drive train of claim 4, wherein the engine gear train driven by said crank gear includes a camshaft for operating engine components in timed relationship to the rotation of said crankshaft, a cam gear mounted on said camshaft and an intermediary gear for transferring the drive force from said crank gear to said cam gear, further including a lash control means positioned along the engine gear train for minimizing the lash between said intermediary gear and said crank and cam gears.

9. The engine drive train of claim 8, wherein said lash control means includes a first set of scissors gears positioned in meshing relationship between said crank gear and said intermediary gear and a second set of scissors gears positioned in meshing relationship between said intermediary gear and said cam gear.

10. The engine drive train of claim 4, wherein said crankshaft includes a second end opposite said first end and said crank gear is positioned axially along said crankshaft between said damper and said second end of the crankshaft.

11. The engine drive train of claim 10, wherein said damper and said isolator are positioned in a common plane transverse to a longitudinal axis of said crankshaft.

12. The engine drive train of claim 11, wherein said isolator is positioned radially from said longitudinal axis of said crankshaft between said crank gear and said damper.

* * * * *